Patented Sept. 18, 1945

2,384,880

UNITED STATES PATENT OFFICE 2,384,880

VINYLIDENE CHLORIDE COMPOSITIONS

Edgar C. Britton and Harold W. Moll, Midland, Mich., assignors to The Dow Chemical Company, Midland, Mich., a corporation of Michigan No Drawing. Application July 18, 1941,
Serial No. 403,012

3 Claims. (Cl. 260—42)

This invention relates to thermoplastic compositions comprising polymeric vinylidene chloride products modified with urea-formaldehyde resins and particularly to compositions modified with non-aqueous-solvent soluble urea-formaldehyde resins.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonly, 2-chloroallyl, or cinnamyl esters of mono- and di-carboxylic acids. The polymer of vinylidene chloride alone is described in U. S. Patent No. 2,160,903 and many of its copolymers with other polymerizable compounds, as well as certain plasticized compositions comprising these copolymers, and ways in which the products may be made, are described in U. S. Patents 2,160,904, 2,206,022, 2,215,379, and 2,160,931 to 2,160,948, inclusive.

Urea-formaldehyde resins are the products obtained by reacting urea with an aqueous solution of formaldehyde in the presence of a catalyst. The unpolymerized resins are colorless and water-soluble. They are thermosetting and may be cured to form an infusible and insoluble product. The urea-formaldehyde resins are modified to make them soluble in non-aqueous solvents by preparing them in the presence of polyhydric alcohols or alkyd resins. As supplied to the trade they are still in a reactive state, and are obtained as solutions of the resins in various solvents.

According to the present invention non-aqueous-solvent soluble urea-formaldehyde resins are incorporated with a polymeric vinylidene chloride product to produce a mass which can be molded or extruded to form articles having a high gloss, a white color, a durable finish, and which are stable to light. For example, a non-aqueous-solvent soluble urea-formaldehyde resin may be incorporated with a polymeric vinylidene chloride product to produce a mass which can be extruded at relatively low temperatures and pressures to form valuable articles, threads, bands, filaments, foils, and the like, that are flexible, have an opaque white color, and are stable to light, showing only slight darkening after many hours exposure in a standard Fadeometer. The non-aqueous-solvent soluble urea-formaldehyde resins though apparently compatible at fusion temperatures become incompatible at room temperature with polymeric vinylidene chloride products and produce in the cold products the effect of adding a white pigment. The thermoplastic masses may be molded or extruded to form articles having when cold an opaque white color, a high degree of flexibility and which are stable to light. The non-aqueous-solvent soluble urea-formaldehyde resins are particularly advantageous for producing thermoplastic compositions that have a white color. Being resins they do not produce the deleterious effects that are obtained when non-plastic substances are added that produce a white color by reason of their being dispersed in the composition. Furthermore, non-aqueous-solvent soluble urea-formaldehyde resins do not decompose polymeric vinylidene chloride products in the presence of heat and they do not have any increased abrasive action on the extrusion dies.

The addition of non-aqueous-solvent soluble urea-formaldehyde resins to the polymeric vinylidene chloride product may be effected by any of several methods. For example, the polymeric vinylidene chloride product and the particular non-aqueous-solvent soluble urea-formaldehyde resins to be employed may be mixed or ground together in a ball mill or other suitable mixer commonly employed in the plastic art, or they may be added to the polymer on hot rolls in a method similar to compounding rubber compositions. Another satisfactory method of incorporating the non-aqueous-solvent soluble urea-formaldehyde resin with the polymeric vinylidene chloride product is to dissolve the resin in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof.

Example 1

A quantity, corresponding to 2.5 grams of solids, of Uformite F-301, a solution of an alkyd-resin-modified urea-formaldehyde resin in a mixture of butanol and xylol, was incorporated with 18 ml. of acetone. To this solution was added 47.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.020 inch, prepared from this material were flexible glossy white threads and had a tensile strength above 30,000 pounds per square inch. Samples of the filaments showed slight darkening after 24 hours exposure to light in a standard Fadeometer.

Example 2

A quantity corresponding to 2.5 grams of solids of Arodure 1400, a solution of an alkyd-resin-modified urea-formaldehyde resin, and 5.0 grams of tributyl aconitate, to serve as a heat and light stabilizer, were incorporated with 18 ml. of acetone. To this solution was added 42.5 grams of a co-polymer consisting of 90 per cent vinylidene chloride and 10 per cent vinyl chloride. The mixure could easily be molded or extruded and filaments, having a diameter of 0.020 inch, prepared from this material were tough, white, threads and had a tensile strength above 24,000 pounds per square inch. Samples of the filaments showed only slight darkening after 100 hours exposure to light in a standard Fadeometer.

Example 3

A quantity, corresponding to 2.5 grams of solids, of Beckamine 3440, a solution of a modified urea-formaldehyde resin in butanol, and 5.0 grams of 1,2-epoxy-3-(2-phenyl-phenoxy) propane, to serve as a heat stabilizer, were incorporated with 18 ml. of acetone. To this solution was added 42.5 grams of a co-polymer consisting of 90 per cent of vinylidene chloride and 10 per cent vinyl chloride. The mixture was ground until thoroughly blended, and then dried. The composition could easily be molded or extruded and filaments, having a diameter of 0.017 inch, prepared from this material were flexible, tough, white, threads with a glossy finish and had a tensile strength above 30,000 pounds per square inch.

Example 4

A quantity, corresponding to 1.5 grams of solids, of Arodure 1400, a solution of an alkyd-resin-modified urea-formaldehyde resin and 5.0 grams of di-(alpha-phenylethyl) ether to serve as a heat stabilizer, were incorporated with 18 ml. of acetone. To this solution was added 43.5 grams of a co-polymer consisting of 90 per cent vinylidene chloride and 10 per cent vinyl chloride. The mixture was ground until thoroughly blended and then dried. The composition could easily be molded or extruded and filaments having a diameter of 0.019 inch prepared from this material were translucent flexible threads and had a tensile strength above 22,000 pounds per square inch.

Example 5

A quantity, corresponding to 2.5 grams of solids of Uformite F-226, a solution of a urea-formaldehyde resin in capryl (secondary octyl) alcohol and 5.0 grams of di-(alpha-phenylethyl) ether, to serve as a heat stabilizer, were incorporated with 18 ml. of acetone. To this solution was added 42.5 grams of a co-polymer as in Example 1. The composition could easily be molded or extruded and filaments having a diameter of 0.0165 inch, prepared from this material were flexible slightly translucent white threads and had a tensile strength above 22,000 pounds per square inch.

The compositions may contain varying amounts of the urea-formaldehyde resins, depending on the use requirements. In the practice of the invention it is preferred to use from about 0.5 to about 40 per cent, and more specifically between about 2.0 and about 7.5 per cent of the urea-formaldehyde resin, based on the weight of the vinylidene chloride product used, but more or less than the suggested amounts may be used.

While the above examples show the preparation of compositions from a polymeric vinylidene chloride product consisting of a co-polymer of 90 per cent vinylidene chloride and 10 per cent vinyl chloride, incorporated with non-aqueous-solvent soluble urea-formaldehyde, other polymeric vinylidene chloride products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride compositions at temperatures above their respective softening points, where the material is often maintained at such temperatures for a considerable period of time, it is desirable to have present in the composition a heat-stabilizing agent which acts to decrease or prevent thermal decomposition. In many instances a substance which also acts as a plasticizer is often desirable. Compounds applicable for these purposes include 1,2-epoxy-3-(2-phenylphenoxy) propane, tributyl aconitate, allyl disulfide, 2-chloroallyl disulfide, 2,2'-(dihydroxy-benzophenone) dipropyl maleate, butyl cinnamate, and di-(alpha-phenylethyl) ether.

The incorporation of minor amounts of coloring agents, plasticizers, fillers, and the like has been found advantageous and desirable when used in such amounts that they do not impair the useful mechanical properties of the product.

Other modes of applying the principle of our invention may be employed instead of those explained, change being made as regards the materials employed, provided the product recited in the following claims be obtained.

We therefore point out and distinctly claim as our invention:

1. A thermoplastic composition the essential ingredients of which are a copolymer of from about 5 to about 30 per cent of vinyl chloride and correspondingly from about 95 to about 70 per cent of vinylidene chloride, and between about 2 and about 7.5 per cent, based on the weight of the polymer, of a urea-formaldehyde resin which is soluble in nonaqueous solvents and insoluble in water.

2. A thermoplastic composition, the essential ingredients of which are a polymer of vinylidene chloride, wherein the vinylidene constitutes at least 70 per cent of the polymer, and from about 0.5 to about 40 per cent, based on the weight of the polymer, of a urea formaldehyde resin, which is soluble in non-aqueous solvents and insoluble in water.

3. A thermoplastic composition, the essential ingredients of which are a polymer of vinylidene chloride, wherein the vinylidene chloride constitutes at least 70 per cent of the polymer, and between about 2 and about 7.5 per cent, based on the weight of the polymer, of a urea formaldehyde resin, which is soluble in non-aqueous solvents and insoluble in water.

EDGAR C. BRITTON.
HAROLD W. MOLL.